US011460060B2

(12) United States Patent
Kurokawa

(10) Patent No.: US 11,460,060 B2
(45) Date of Patent: Oct. 4, 2022

(54) COMPONENT JOINING STRUCTURE

(71) Applicant: TOYOTA JIDOSHA KABUSHIKI KAISHA, Toyota (JP)

(72) Inventor: Hiroyuki Kurokawa, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 634 days.

(21) Appl. No.: 16/214,304

(22) Filed: Dec. 10, 2018

(65) Prior Publication Data

US 2019/0226508 A1 Jul. 25, 2019

(30) Foreign Application Priority Data

Jan. 23, 2018 (JP) .............................. JP2018-009230

(51) Int. Cl.
| | |
|---|---|
| *F16B 5/08* | (2006.01) |
| *F16B 5/06* | (2006.01) |
| *F16B 11/00* | (2006.01) |
| *B29C 45/00* | (2006.01) |
| *B29C 45/14* | (2006.01) |
| *B23K 11/00* | (2006.01) |
| *B23K 11/11* | (2006.01) |

(Continued)

(52) U.S. Cl.
CPC ............ *F16B 5/065* (2013.01); *B23K 11/004* (2013.01); *B23K 11/0026* (2013.01); *B23K 11/115* (2013.01); *B23K 11/20* (2013.01); *B29C 45/0005* (2013.01); *B29C 45/14008* (2013.01); *B29C 45/14639* (2013.01); *B29C 65/64* (2013.01); *F16B 5/08* (2013.01); *F16B 11/006* (2013.01); *B23K 2101/006* (2018.08);
*B23K 2101/185* (2018.08); *B23K 2103/04* (2018.08); *B23K 2103/10* (2018.08); *B23K 2103/20* (2018.08); *B23K 2103/42* (2018.08); *B29K 2705/02* (2013.01); *B29K 2705/12* (2013.01); *Y10T 403/471* (2015.01); *Y10T 403/472* (2015.01)

(58) Field of Classification Search
CPC ..... B29C 65/56; B29C 65/562; B29C 65/565; B29C 65/64; F16B 5/08; Y10T 403/471; Y10T 403/472

See application file for complete search history.

(56) References Cited

U.S. PATENT DOCUMENTS

| | | | | |
|---|---|---|---|---|
| 3,093,887 | A | * 6/1963 | Prestige | ............. H05K 13/0465 |
| | | | | 29/845 |
| 7,165,312 | B2 | * 1/2007 | Vrana | ................... B23P 19/062 |
| | | | | 29/243.5 |

(Continued)

FOREIGN PATENT DOCUMENTS

| | | | |
|---|---|---|---|
| DE | 100 15 713 | * 10/2001 | ................ F16B 5/04 |
| JP | 61-203128 U | 12/1986 | |

(Continued)

*Primary Examiner* — Michael P Ferguson
(74) *Attorney, Agent, or Firm* — Oblon, McClelland, Maier & Neustadt, L.L.P.

(57) ABSTRACT

There is provided a component joining structure that includes: a resin component; a metal tip that is provided in the resin component by insert molding, and that includes protruding portions that protrude from the resin component; and a metal component that is spot welded to the protruding portions, and that is joined to the resin component by an adhesive agent that is provided in gaps formed, by the protruding portions, between the resin component and the metal component.

2 Claims, 14 Drawing Sheets

(51) Int. Cl.
  *B23K 11/20* (2006.01)
  *B29C 65/64* (2006.01)
  *B29K 705/12* (2006.01)
  *B29K 705/02* (2006.01)
  *B23K 103/04* (2006.01)
  *B23K 103/00* (2006.01)
  *B23K 103/10* (2006.01)
  *B23K 103/20* (2006.01)
  *B23K 101/18* (2006.01)
  *B23K 101/00* (2006.01)

(56) References Cited

U.S. PATENT DOCUMENTS

| | | | | |
|---|---|---|---|---|
| 9,648,721 | B2* | 5/2017 | Murray, Jr | H05K 1/02 |
| 9,868,476 | B1* | 1/2018 | Pastrick | B62D 25/06 |
| 2015/0190880 | A1* | 7/2015 | Schneider | B21K 25/00 |
| | | | | 403/266 |
| 2016/0123362 | A1* | 5/2016 | Iwase | F16B 5/08 |
| | | | | 411/82 |
| 2016/0136880 | A1* | 5/2016 | Matsuo | F16B 5/04 |
| | | | | 411/82 |
| 2016/0363147 | A1* | 12/2016 | Izuhara | F16B 19/08 |

FOREIGN PATENT DOCUMENTS

| | | |
|---|---|---|
| JP | 4-107113 | 4/1992 |
| JP | 2013-122285 A | 6/2013 |
| JP | 2016-43366 | 4/2016 |
| WO | WO 2015/015906 A1 | 2/2015 |
| WO | WO 2015/135712 A1 | 9/2015 |

\* cited by examiner

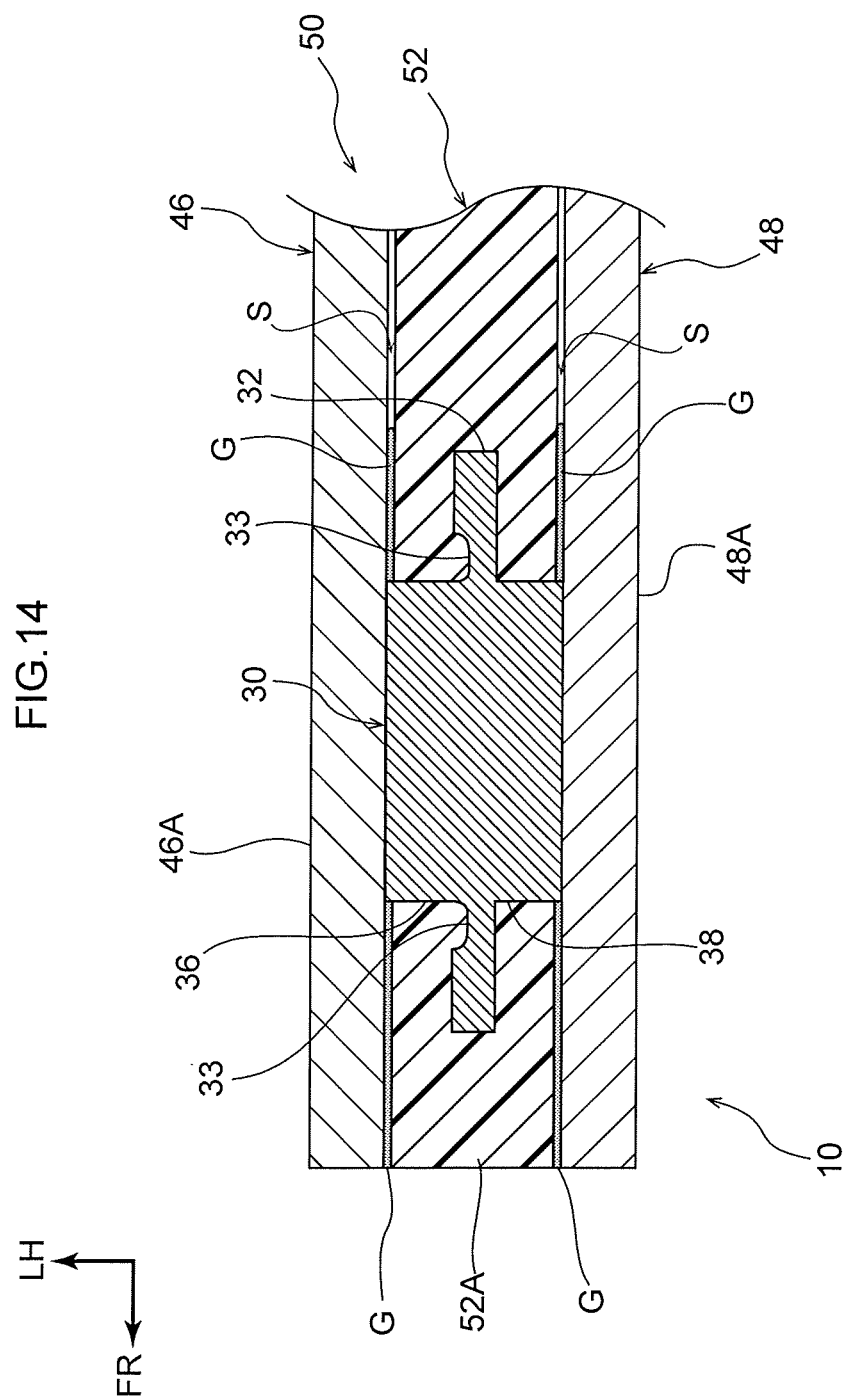

COMPONENT JOINING STRUCTURE

CROSS-REFERENCE TO RELATED APPLICATION

This application is based on and claims priority under 35 USC 119 from Japanese Patent Application No. 2018-009230 filed on Jan. 23, 2018, the disclosure of which is incorporated by reference herein.

BACKGROUND

Technical Field

The present disclosure relates to a component joining structure.

Related Art

Conventionally, a fiber-reinforced resin molded panel has been proposed (see, for example, Japanese Unexamined Patent Application (JP-A) No. H4-107113) in which a conductive insert component is set in a metal mold, and a thermosetting resin material is injected into the interior of that metal mold such that a surface of a plate portion of the insert component is exposed from one surface thereof, while distal end portions of a plurality of pins of the insert component protrude from another surface thereof. This fiber-reinforced resin molded panel is joined to a metal sheet by spot welding the distal end portions of the plurality of pins of the insert component to the metal sheet.

However, if a resin component such as a fiber-reinforced resin molded panel is joined to a metal component such as a metal sheet such that both are in direct contact with each other, there is a concern that galvanic corrosion will occur between the resin component and the metal component.

SUMMARY

Therefore, it is an object of the present disclosure to provide a component joining structure that enables occurrences of galvanic corrosion between a resin component and a metal component to be inhibited.

In order to achieve the above-described object, a component joining structure of a first aspect of the present disclosure is provided with a resin component, a metal tip that is provided in the resin component by insert molding, and that includes protruding portions that protrude from the resin component, and a metal component that is spot welded to the protruding portions, and that is joined to the resin component by an adhesive agent that is provided in gaps formed, by the protruding portions between the resin component and the metal component.

According to the above-described first aspect of the present disclosure, a tip that is made of metal is provided by insert molding in a resin component, and these tips have protruding portions that protrude from the resin component. A metal component is then spot welded to these protruding portions, and the metal component is joined to the resin component via an adhesive agent which is provided in the gaps formed by the protruding portions between the metal component and the resin component. In other words, the adhesive agent is interposed between the metal component and the resin component. Accordingly, the occurrence of galvanic corrosion between the metal component and the resin component is inhibited.

A component joining structure of a second aspect of the present disclosure is the component joining structure of the first aspect, wherein the metal tip has a detent portion that prevents rotation relative to the resin component.

According to the second aspect of the present disclosure, the metal tip includes a detent portion that prevents rotation relative to the resin component. Accordingly, the strength of the join between the tips and the resin component is improved.

A component joining structure of a third aspect of the present disclosure is the component joining structure according to the second aspect, wherein the metal tip includes: a shaft central portion, the detent portion being formed around an outer circumferential surface of the shaft central portion; and the protruding portions that are provided at both end portions in an axial direction of the shaft central portion, the protruding portions protruding outwards beyond the shaft central portion.

According to the third aspect of the present disclosure, the metal tip has a shaft central portion around whose outer circumferential surface is provided the detent portion, and protruding portions are provided at both end portions in an axial direction of the shaft central portion so as to protrude outwards beyond the shaft central portion. Accordingly, the strength of the join between the tips and the resin component is improved even further.

A component joining structure of a fourth aspect of the present disclosure is the component joining structure of the second aspect, wherein the metal tip has a central plate portion, the detent portion being formed on an outer circumferential surface of the central plate portion, and the protruding portions that are provided so as to protrude respectively from a center of one surface and a center of another surface of the central plate portion.

According to the fourth aspect of the present disclosure, the metal tip has a central plate portion on whose outer circumferential surface is provided the detent portion, and protruding portions are provided so as to protrude respectively from a center of one surface and a center of another surface of the central plate portion. Accordingly, the strength of the join between the metal tip and the resin component is improved even further.

A component joining structure of a fifth aspect of the present disclosure is the component joining structure of the fourth aspect, wherein the detent portion is formed on an outer circumferential surface of the protruding portions.

According to the fifth aspect of the present disclosure, a detent portion is formed on an outer circumferential surface of the protruding portions. Accordingly, the strength of the join between the metal tip and the resin component is improved even further.

A component joining structure of a sixth aspect of the present disclosure is the component joining structure of the fourth of fifth aspects, wherein the central plate portion has groove portions in the one surface and in the other surface on the outer side of the protruding portions, and the groove portions are formed in positions where they do not mutually overlap with each other between the one surface side and on the other surface side.

According to the sixth aspect of the present disclosure, groove portions are formed in the one surface and in the other surface of the central plate portion on the outer side of the protruding portions. These groove portions are formed in positions where they do not mutually overlap with each other between one surface side and on another surface side of the central plate portion. Accordingly, at the same time as any lowering of the rigidity of the central plate portion is inhibited, the strength of the join between the metal tip and the resin component is improved even further.

A component joining structure of a seventh aspect of the present disclosure is the component joining structure of the sixth aspect, wherein a plurality of the groove portions are formed at equally spaced intervals.

According to the seventh aspect of the present disclosure, a plurality of the groove portions are formed at equally spaced intervals. Accordingly, the strength of the join between the metal tip and the resin component is improved even further.

A component joining structure of an eighth aspect of the present disclosure is the component joining structure of any one of the second through seventh aspects, wherein the detent portion is formed by serrations.

According to the eighth aspect of the present disclosure, the detent portion is formed by serrations. Accordingly, a superior join strength between the metal tip and the resin component can be ensured.

According to the first aspect of the present disclosure, the occurrence of galvanic corrosion between the metal component and the resin component is inhibited.

According to the second aspect of the present disclosure, the strength of the join between the metal tip and the resin component is improved.

According to the third or fourth aspects of the present disclosure, the strength of the join between the metal tip and the resin component is improved even further.

According to the fifth or seventh aspects of the present disclosure, the strength of the join between the metal tip and the resin component is improved still further.

According to the sixth aspect of the present disclosure, at the same time as any lowering of the rigidity of the central plate portion is inhibited, the strength of the join between the metal tip and the resin component is improved still further.

According to the eighth aspect of the present disclosure, a superior join strength between the metal tip and the resin component can be ensured.

BRIEF DESCRIPTION OF THE DRAWINGS

Exemplary embodiments of the present disclosure will be described in detail based on the following figures, wherein:

FIG. 14 is a cross-sectional view showing an enlargement of the joining structure according to the second exemplary embodiment.

DETAILED DESCRIPTION

Hereinafter, exemplary embodiments of the present disclosure will be described in detail based on the drawings. Note that an arrow UP, an arrow FR, and an arrow LH that are shown in the appropriate drawings respectively indicate a vehicle upward direction, a vehicle forward direction, and a vehicle left side direction. Accordingly, if up-down, front-rear, or left-right directions are used in the following description, then, unless specifically stated otherwise, these refer respectively to the up-down directions of the vehicle, the front-rear directions of the vehicle, and the left-right directions of the vehicle (i.e., the vehicle width direction).

First Exemplary Embodiment

Figure 1:
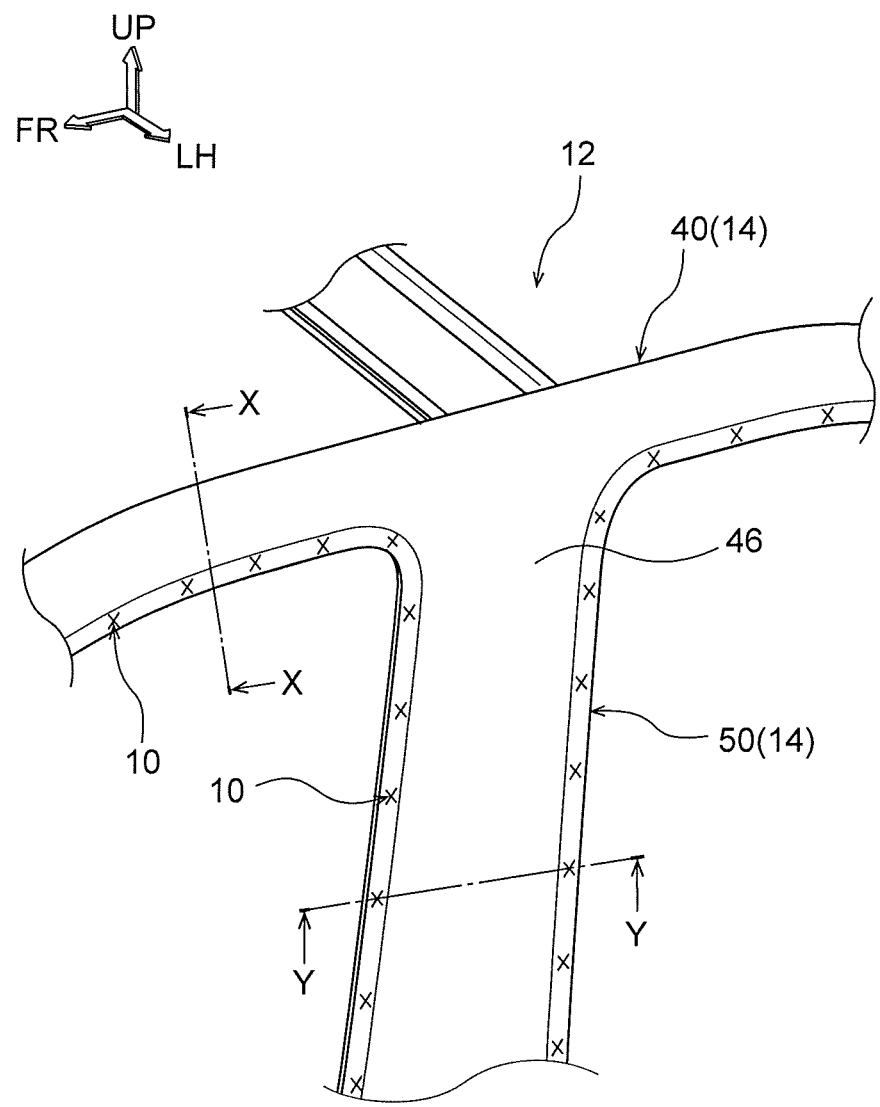
FIG. 1 is a perspective view showing a roof side rail and a center pillar in which a joining structure according to the present exemplary embodiments is used.

Firstly, a component joining structure 10 according to a first exemplary embodiment will be described. The component joining structure 10 according to the present exemplary embodiment is a structure for joining together a component made of resin (i.e., a resin component) and a component made of metal (i.e., a metal component), and, for example, as is shown in FIG. 1, is a structure for joining a resin component forming part of a frame component 14 of a vehicle 12 such as a roof side rail 40 or a center pillar 50 to metal components (i.e., metal tips 20 shown in FIG. 2 and FIG. 3) by means of spot welding.

Figure 2:
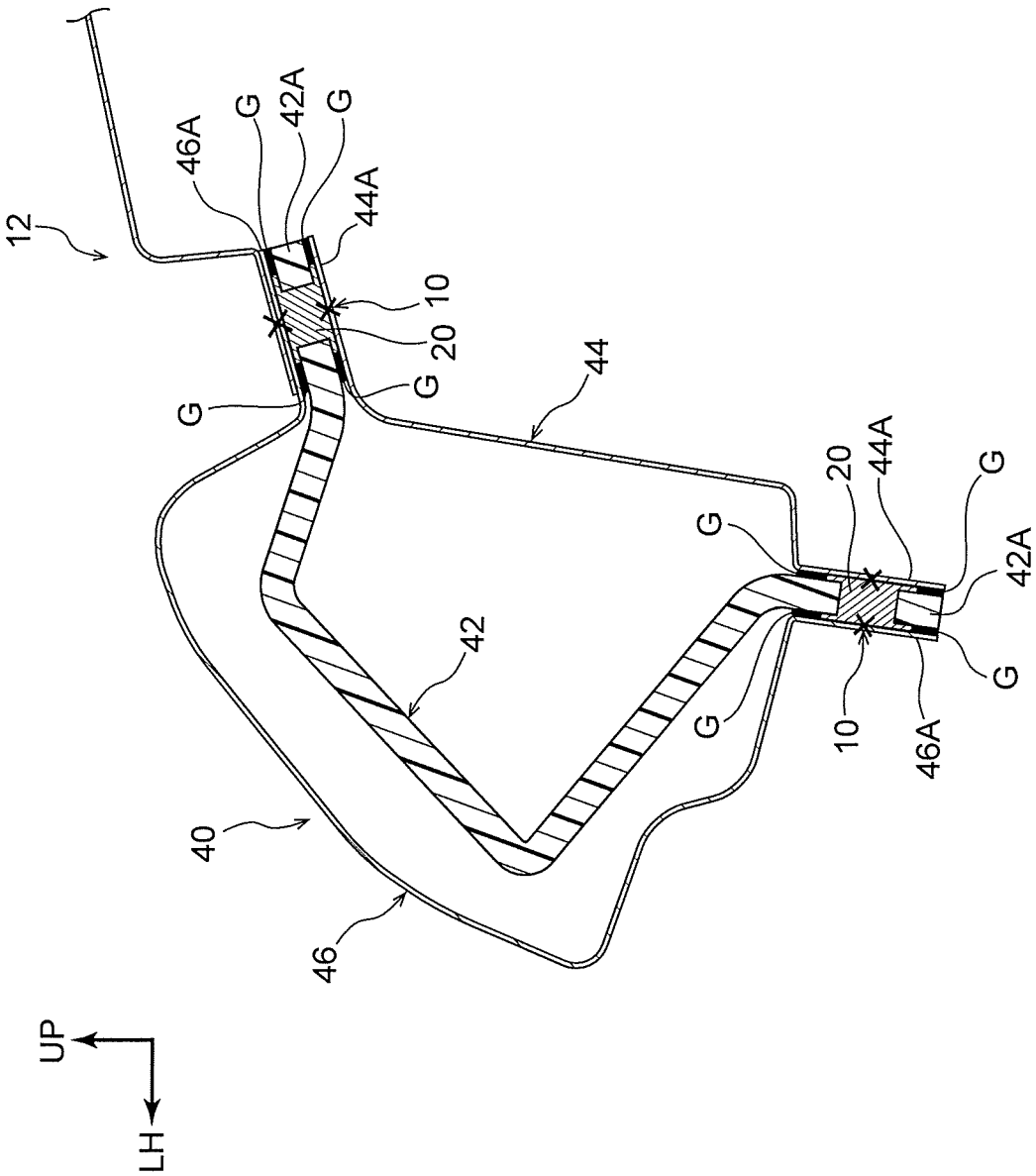
FIG. 2 is a cross-sectional view across a line X-X in FIG. 1.

More specifically, as is shown in FIG. 2, a structure is employed in which, in the case of the roof side rail 40, flange portions 44A of a roof rail inner 44 that is made of metal (for example, iron or aluminum alloy) and flange portions 46A of a side panel outer 46 that is made of metal (for example, iron or aluminum alloy) are joined via spot-welding to a flange portion 42A (i.e., the tips 20) of a roof rail reinforcement 42 that is made of fiber-reinforced resin (FRP) so as to have a hat-shaped cross-section.

Figure 3:
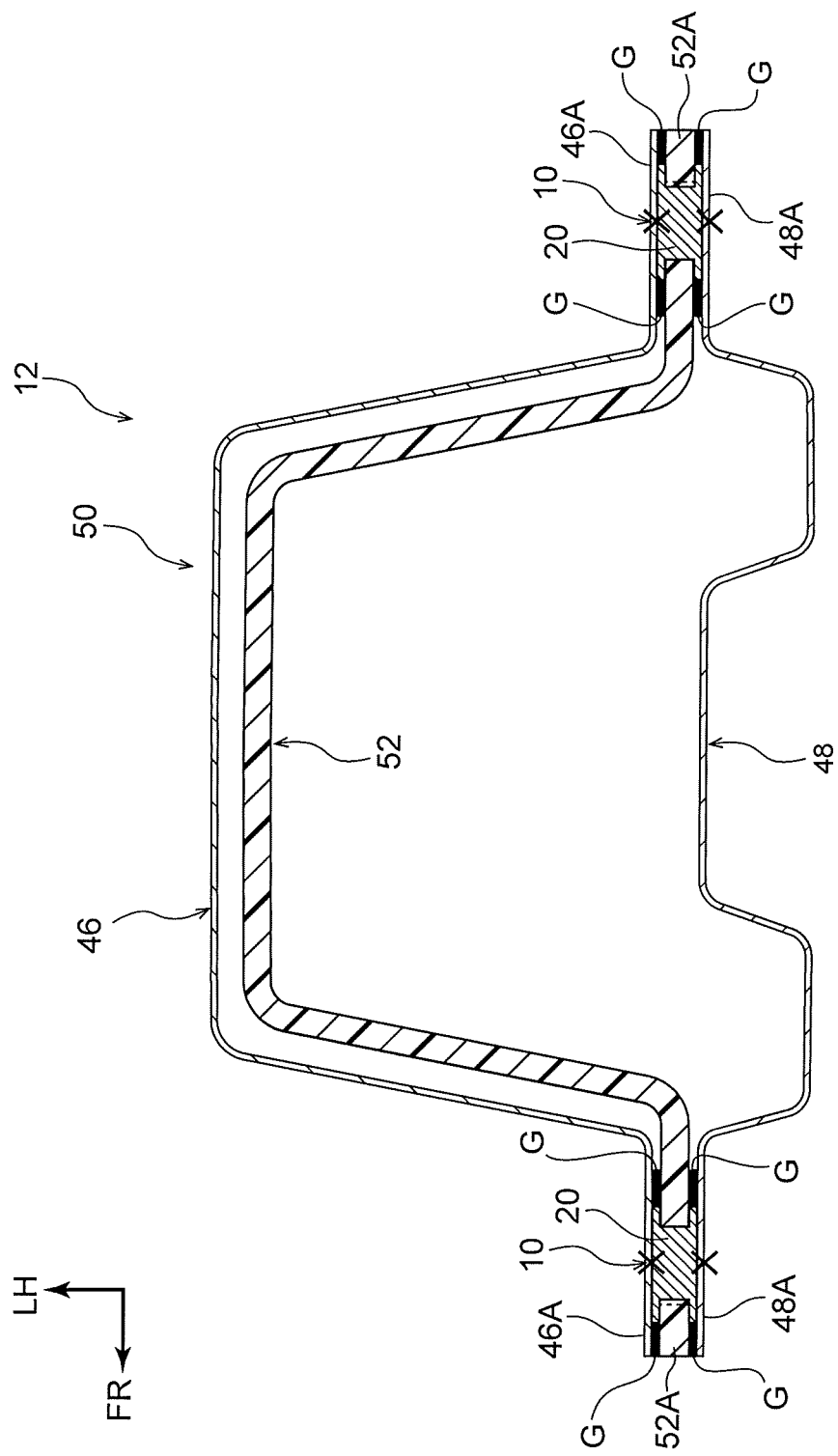
FIG. 3 is a cross-sectional view across a line Y-Y in FIG. 1.

Moreover, as is shown in FIG. 3, in the case of the center pillar 50, a structure is employed in which flange portions 48A of a center pillar inner 48 that is made of metal (for example, iron or aluminum alloy) and the flange portions 46A of the side panel outer 46 that is made of metal (for example, iron or aluminum alloy) and is formed having a hat-shaped cross-section are joined by spot-welding to flange portions 52A (i.e., the tip 20) of a center pillar reinforcement 52 that is made of fiber-reinforced resin (FRP) so as to have a hat-shaped cross-section.

Because a common joining structure is used for the joining structure 10 used to join the flange portions 44A and 46A to the flange portions 42A, and for the joining structure 10 used to join the flange portions 48A and 46A to the flange portions 52A, the joining structure 10 used in the center pillar 50 is used mainly as an example in the following description.

Figure 4:
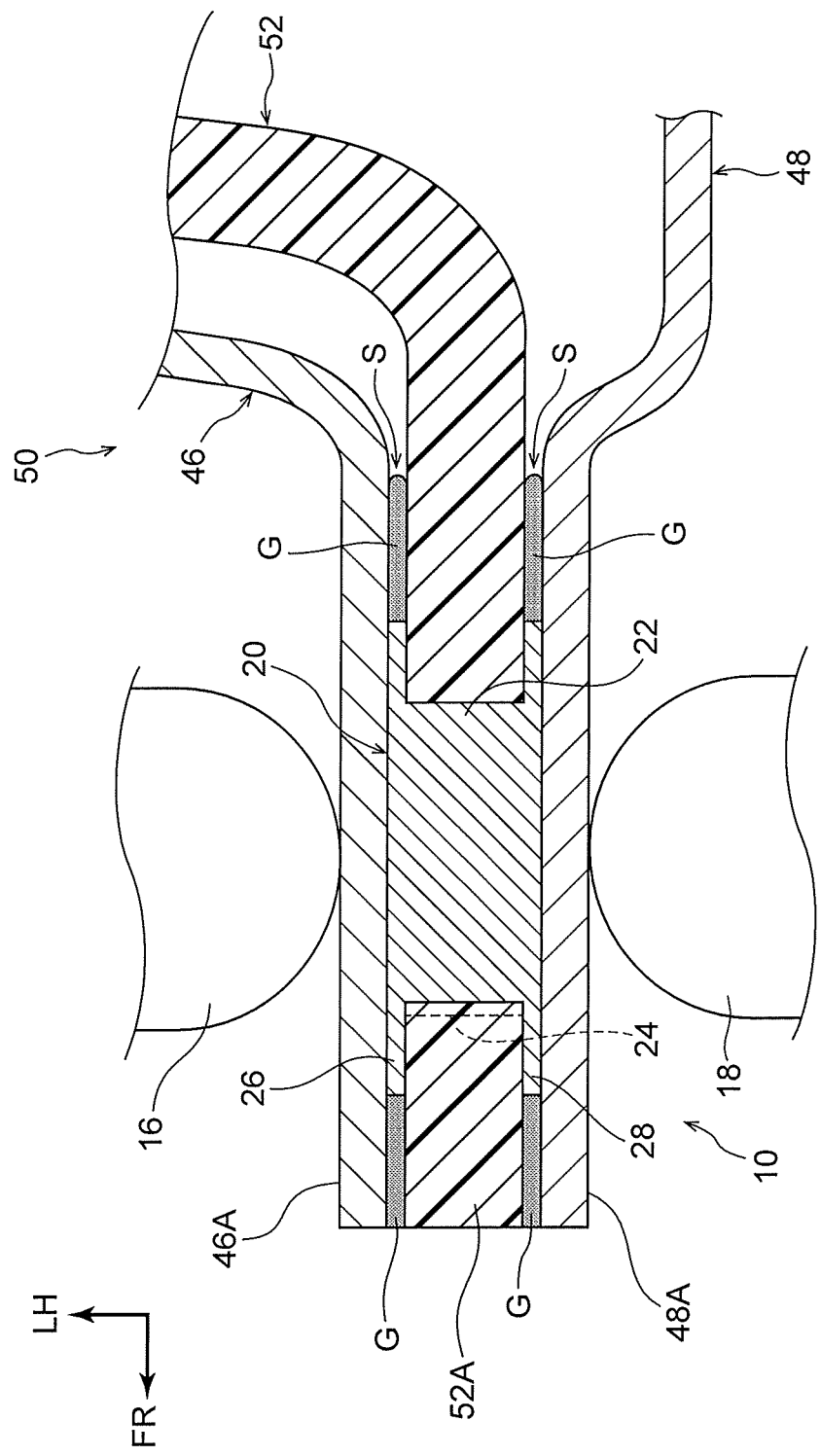
FIG. 4 is a cross-sectional view showing an enlargement of a joining structure according to a first exemplary embodiment.
Figure 5:
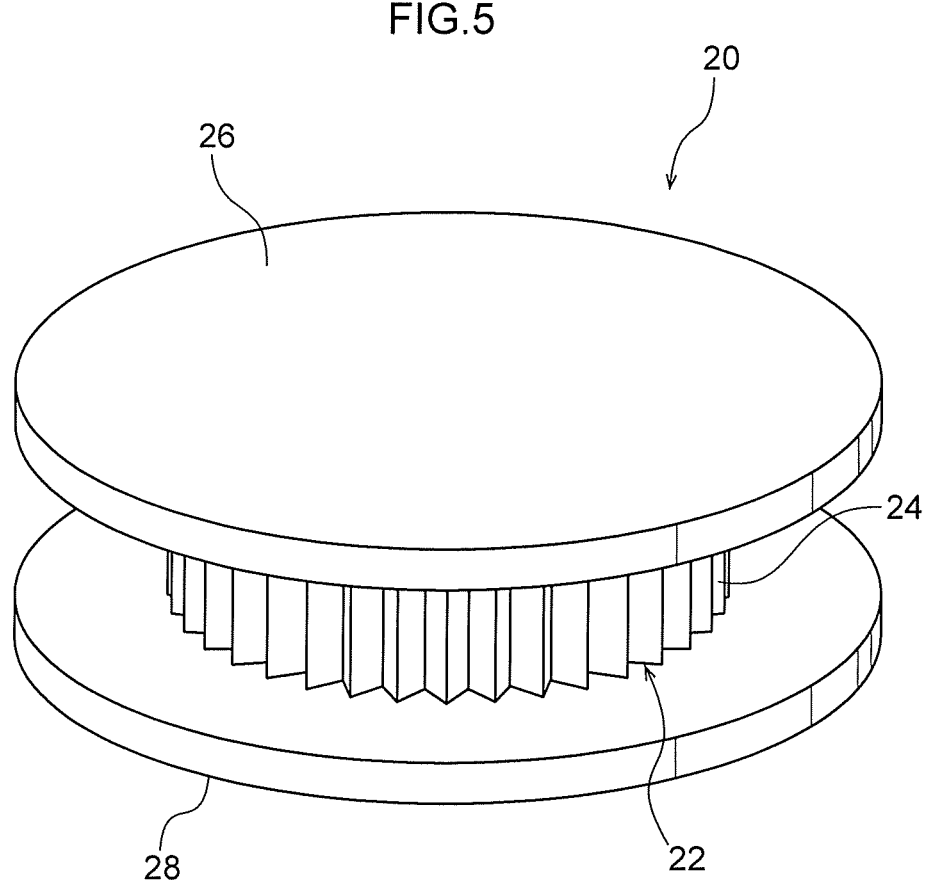
FIG. 5 is a perspective view of a tip forming part of the joining structure according to the first exemplary embodiment.

As is shown in FIG. 4 and FIG. 5, the joining structure 10 according to the present exemplary embodiment has metal tips 20 that are provided integrally, by insert molding, with the flange portions 52A of the center pillar reinforcement 52.

A plurality of tips 20 (see FIG. 1) are provided at the locations where spot welding is performed, at predetermined intervals (for example, at equally spaced intervals) from each other in a longitudinal direction that is orthogonal to the direction in which the flange portions 52A protrudes. Note that the tips 20 are manufactured from an appropriately selected metal material such as iron or aluminum alloy so as to match the metal material used for the other component of the spot welding pairing.

As is shown in FIG. 5, the tips 20 have a circular cylinder-shaped (or, alternatively, a circular column-shaped) shaft central portion 22 on whose outer circumferential surface are formed serrations (i.e., saw teeth shaped grooves) 24 that serve as a detent portion for preventing any rotation thereof relative to the flange portion 52A, and circular plate-shaped protruding portions 26 and 28 that are provided integrally with both end portions in the axial direction of the shaft central portion 22 so as to be coaxial with the shaft central portion 22, and so as to protrude respectively towards an outer side in a radial direction.

The protruding portion 26 and the protruding portion 28 have mutually identical shapes, and when the tip 20 is set within a metal mold (not shown in the drawings) in order to be insert molded in the flange portion 52A, the protruding portion 26 and the protruding portion 28 are set inside the mold such that they are held firmly in the mold. When a fiber-reinforced resin material is subsequently injected into the metal mold, the fiber-reinforced resin flows into the space between the protruding portion 26 and the protruding portion 28, and flows into the serrations 24 that are formed on the shaft central portion 22.

As a result, the tips 20 are formed integrally with the flange portion 52A such that the tips 20 are unable to rotate relative to the flange portion 52A, and such that they are firmly joined (i.e., tightly stuck) thereto. Note that when the tips 20 are being insert molded in the flange portion 52A, the protruding portions 26 and the protruding portions 28 are disposed respectively on one surface and on another surface of the flange portion 52A. In other words, the protruding portion 26 and the protruding portion 28 are formed such that they protrude onto the outside from the flange portion 52A (see FIG. 4).

As is shown in FIG. 4, when the flange portion 48A of the center pillar inner 48 and the flange portion 46A of the side panel outer 46 are being joined to the flange portion 52A of the center pillar reinforcement 52, the flange portion 48A and the flange portion 46A are mutually superimposed on the one surface and on the other surface respectively of the flange portion 52A. The flange portion 48A and the flange portion 46A are then joined respectively by means of spot welding to the protruding portion 26 and the protruding portion 28 of the tip 20 (one electrode 16 and another electrode 18 that are used for the spot welding are shown in FIG. 4).

Here, as is shown in FIG. 4, uniform gaps S having the same width as the thickness of the protruding portion 26 (for example, approximately 1.0 mm) and the thickness of the protruding portion 28 (for example, approximately 1.0 mm) are formed respectively between the flange portion 52A and the flange portion 58A and between the flange portion 52A and the flange portion 46A.

An adhesive agent G is provided in these gaps S (either by being injected so as to fill the gaps S or via a pre-coating process). In other words, the flange portion 52A and the flange portion 48A, and also the flange portion 52A and the flange portion 48A are joined together respectively not only by spot welding, but also by the adhesive agent G.

Actions of the joining structure 10 according to the first exemplary embodiment which has the above described structure will now be described.

As is shown in FIG. 1 and FIG. 3, a plurality of metal tips 20 are provided by insert molding at predetermined intervals from each other in the longitudinal direction thereof in the flange portion 52A of the fiber-reinforced resin (FRP) center pillar reinforcement 52 that forms part of the center pillar 50. Additionally, the protruding portion 26 and the protruding portion 28 of each tip 20 protrude respectively from the one surface and the other surface of the flange portion 52A.

When joining the flange portion 48A of the center pillar inner 48 and the flange portion 46A of the side panel outer 46 respectively to the one surface and the other surface of the flange portion 52A of the center pillar reinforcement 52, the flange portion 48A and the flange portion 46A are superimposed with each other respectively on the one surface and the other surface of the flange portion 52A. Next, the flange portion 48A and the flange portion 46A are joined respectively to the protruding portion 26 and the protruding portion 28 of the tip 20 via a spot welding process that is typically used on an automobile welding line.

As a result, compared with a conventional joining structure, in other words, compared with a structure in which through holes (not shown in the drawings) are formed in each of the flange portions 52A, 48A, and 46A, and the flanges are joined together using blind rivets (not shown in the drawings), or a structure in which the flanges are fastened together using nuts and bolts, the respective flanges 52A, 48A, and 46A can be joined together more quickly. In other words, it is possible to omit the blind rivet fastening step, or the step of screwing the bolt into the nut.

Moreover, because there are no fasteners such as blind rivets or nuts and bolts protruding from the respective flange portions 48A and 46A, as is described below, the thickness of the adhesive G layer can be made uniform. Additionally, it is also possible to omit the step of forming through holes in advance in the respective flange portions 52A, 48A, and 46A.

Normally, when forming through holes in advance in the respective flange portions 52A, 48A, and 46A, in consideration of any irregularities that might occur during the assembly process, a hole diameter that is larger than the hole diameter actually required is formed. This may cause a reduction in the strength of the respective flange portions 52A, 48A, and 46A. However, in the joining structure 10 according to the present exemplary embodiment, it is possible to prevent this type of reduction in strength.

Moreover, the uniform gaps S are formed respectively between the flange portion 52A and the flange portion 48A and between the flange portion 52A and the flange portion 46A by the thickness of the protruding portion 26 and the thickness of the protruding portion 28 when the flange portion 48A and the flange portion 46A are superimposed with each other on the one surface and on the other surface respectively of the flange portion 52A, and the adhesive agent G is provided in these gaps S.

Accordingly, the flange portion 52A of the center pillar reinforcement 52 and the flange portion 48A of the center pillar inner 48, as well as the flange portion 52A of the center pillar reinforcement 52 and the flange portion 46A of the side panel outer 48 are also respectively joined together by the adhesive agent G as well.

In other words, the adhesive agent G is interposed between the flange portion 52A and the flange portion 48A and between the flange portion 52A and the flange portion 46A. Accordingly, it is possible to either inhibit or to completely prevent galvanic corrosion from occurring between the flange portion 52A and the flange portion 48A and between the flange portion 52A and the flange portion 46A, so that quality assurance arising from a stable adhesion strength can be achieved.

Moreover, because the size of the gaps S where the adhesive agent G is provided is set by the thickness of the protruding portion 26 and the thickness of the protruding portion 28, a uniform layer thickness of the adhesive agent G around the protruding portion 36 and around the protruding portion 38 can be ensured. Additionally, because each tip 20 has a detent portion (i.e., the serrations 24) to prevent any rotation thereof relative to the flange portion 52A, the join strength (i.e., the adhesion strength) with which the tips 20 are joined to the flange portion 52A can be improved (i.e., can be maintained at a superior level).

In particular, because a structure is employed in which each tip 20 has the shaft central portion 22 on whose outer circumferential surface are provided the serrations 24, and also has the protruding portion 26 and the protruding portion 28 that protrude outwards in a radial direction beyond the shaft central portion 22, the join strength with which the tips 20 are joined to the flange portion 52A can be improved even more. Additionally, because the joining structure 10 according to the present exemplary embodiment has a simple structure, it has the advantage that equipment investment can be kept to a minimum (i.e., costs can be kept in check).

Variant Example

Figure 6:
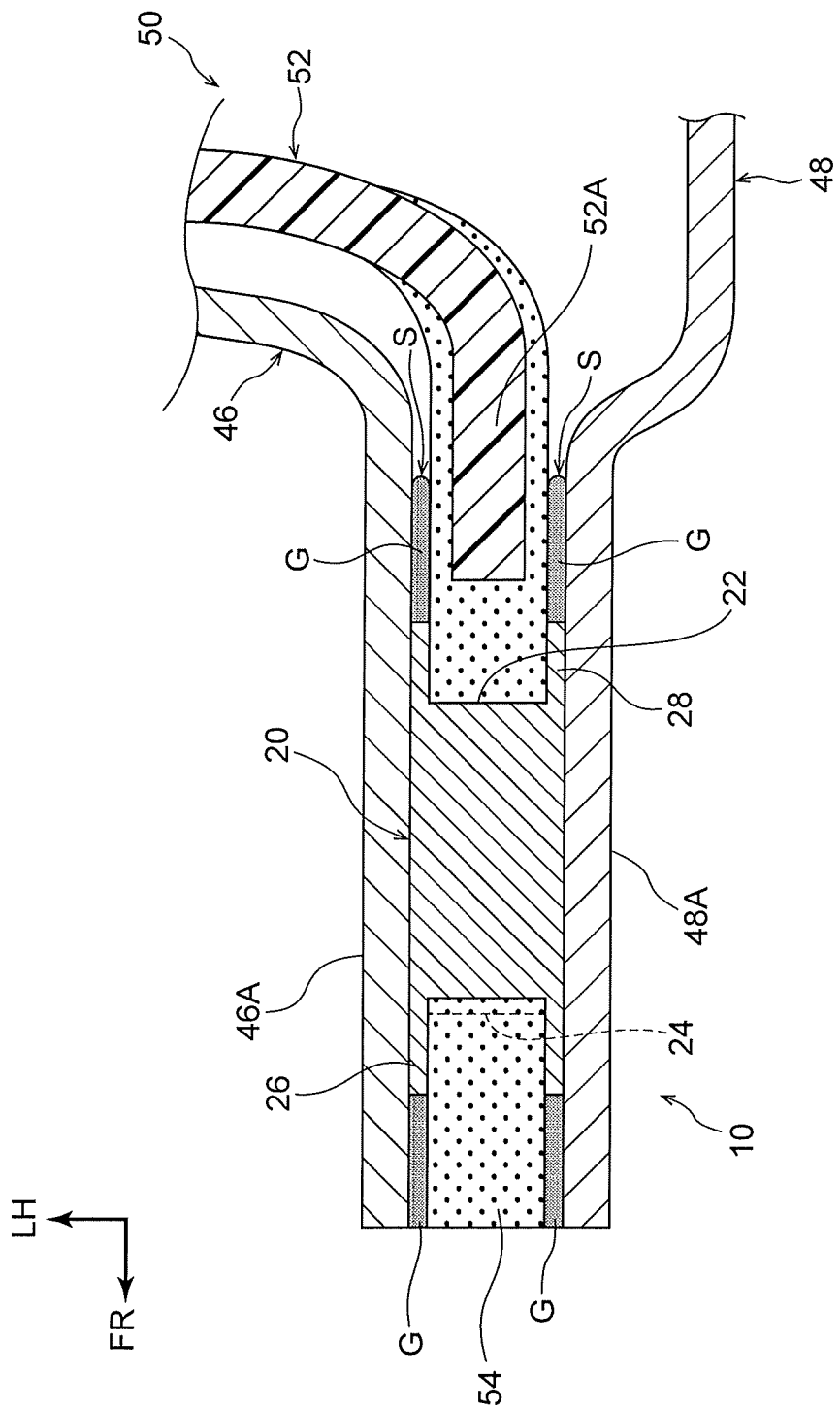
FIG. 6 is a cross-sectional view showing a first variant example of the joining structure according to the first exemplary embodiment.

As is shown in FIG. 6, it is also possible for the joining structure 10 according to the present exemplary embodiment to be applied when the tips 20 are provided by insert molding not in the flange portion 52A that is formed from fiber-reinforced resin, but in a flange portion 54 that is molded integrally with the distal end of the flange portion 52A using a random material, or using an injection material.

Figure 7:
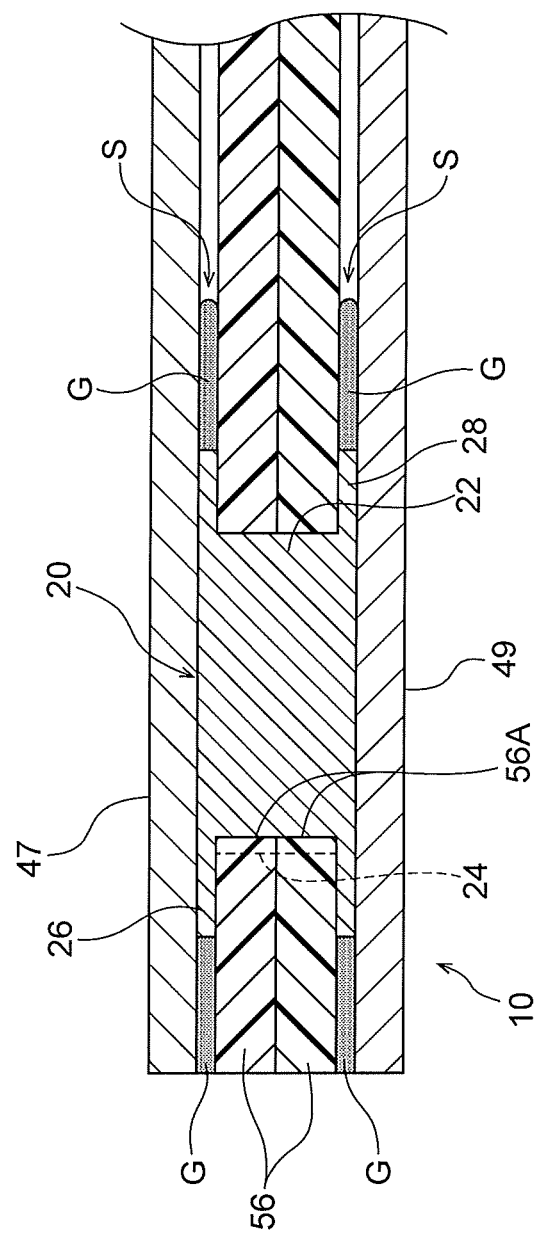
FIG. 7 is a cross-sectional view showing a second variant example of the joining structure according to the first exemplary embodiment.

Furthermore, as is shown in FIG. 7, it is also possible for the joining structure 10 according to the present exemplary embodiment to be applied to resin injection molding using textiles (RTM molding), or to hot press molding using a UD sheet, or the like in which two flange portions 56 that are formed from a sheet-shaped material are sandwiched between the protruding portion 26 and the protruding portion 28 of the tips 20, and are then subsequently cured.

However, in the case of the aspect shown in FIG. 7, it is necessary to form the through holes 56A that are used to insert the shaft central portions 22 in advance in the flange portion 56. In other words, in this case, the shaft central portions 22 have, for example, a double tube structure, and the tips 20 are attached to the flange portion 56 by inserting an inner cylindrical portion (or an outer cylindrical portion) that forms a shaft central portion 22 equipped with the protruding portion 28 into an outer cylindrical portion (or an inner cylindrical portion) that forms a shaft central portion 22 equipped with the protruding portion 26, so that these are joined together.

Note that the above applies in the same way to a case in which a metal flange portion 47 and a metal flange portion 49 are spot welded respectively to the protruding portion 26 and the protruding portion 28, and the flange portion 56 around the protruding portion 26 and around the protruding portion 28 is joined by means of the adhesive agent G to the flange portion 47 and the flange portion 49.

Further examples of a frame component 14 of the vehicle 12 in which the spot welding tips 20 can be insert molded, other than the roof side rail 40 and the center pillar 50, include side members, floor cross members, and rockers (none of these are shown in the drawings). However, the joining structure 10 according to the present exemplary embodiment is not limited to being used in a frame component 14 of the vehicle 12.

Figure 8:
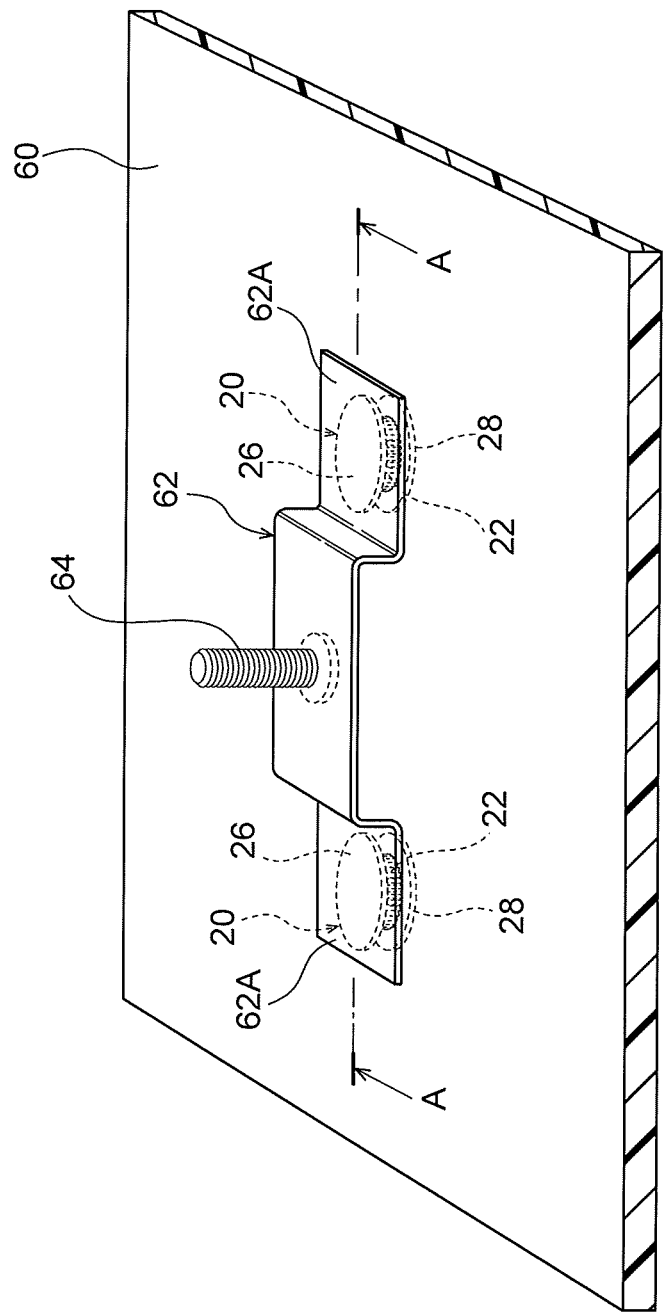
FIG. 8 is a perspective view showing a nautical fitting in which the joining structure according to the first exemplary embodiment is used.
Figure 9:
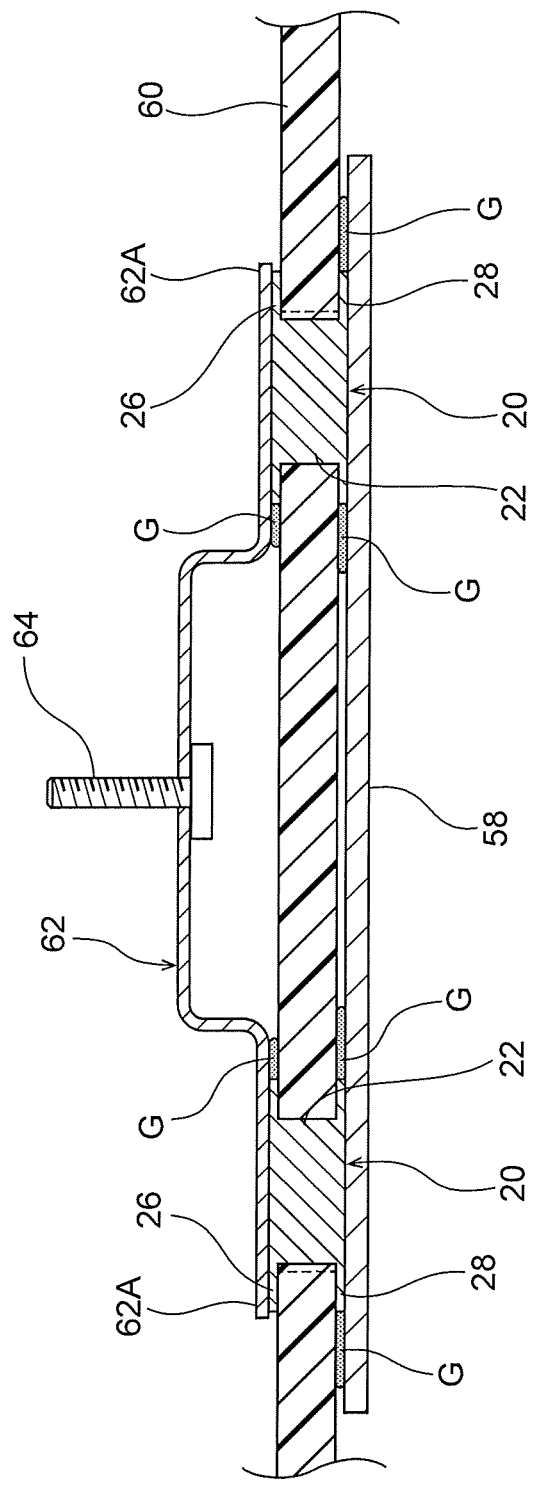
FIG. 9 is a cross-sectional view across a line A-A in FIG. 8.

The joining structure 10 according to the present embodiment may also be used to attach nautical fittings, as is shown, for example, in FIG. 8 and FIG. 9. In other words, tips 20 may also be provided by insert molding in (two) suitable locations on a panel 60 that is made of resin and forms part of a nautical fitting.

In this case, each flange portion 62A of a metal bracket 62 that has a hat-shaped cross section and has a weld bolt 64 provided in a central portion thereof can be joined via spot welding to the protruding portions 26 of the tips 20 that are protruding from a front surface of the panel 60, and can also be joined via the adhesive agent G to the front surface of the panel 60 around those protruding portions 26.

Note that it is also possible to join a flat plate-shaped steel plate 58 via spot welding to the protruding portions 28 that are protruding from the rear surface of the panel 60, and to join this steel plate 58 to the rear surface of the panel 60 around the protruding portions 28 via the adhesive agent G. In other words, the steel plate 58 may be attached as a backing plate to the panel 60. If this structure is employed, the strength and rigidity of the bracket 62 can be improved.

Figure 10:
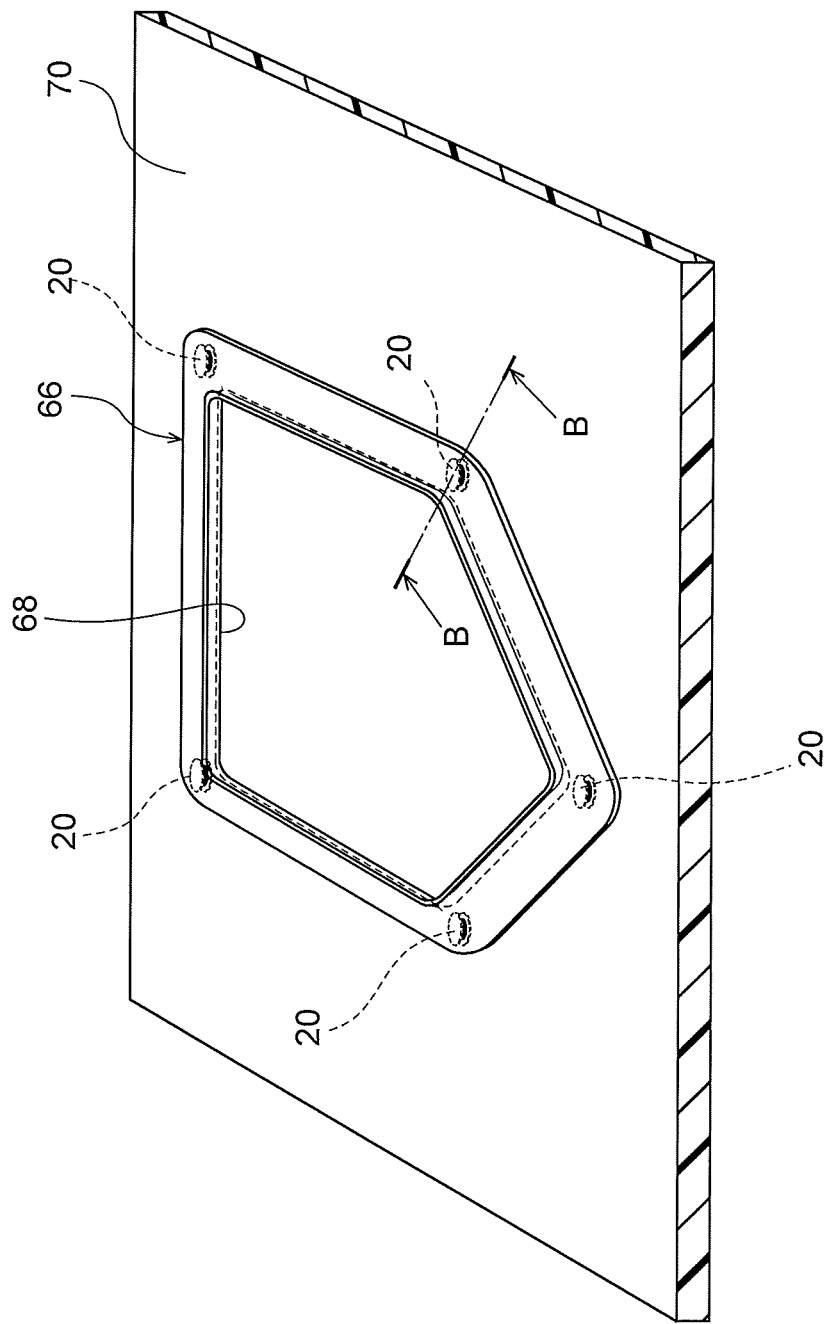
FIG. 10 is a perspective view showing a speaker mounting panel in which the joining structure according to the first exemplary embodiment is used.
Figure 11:
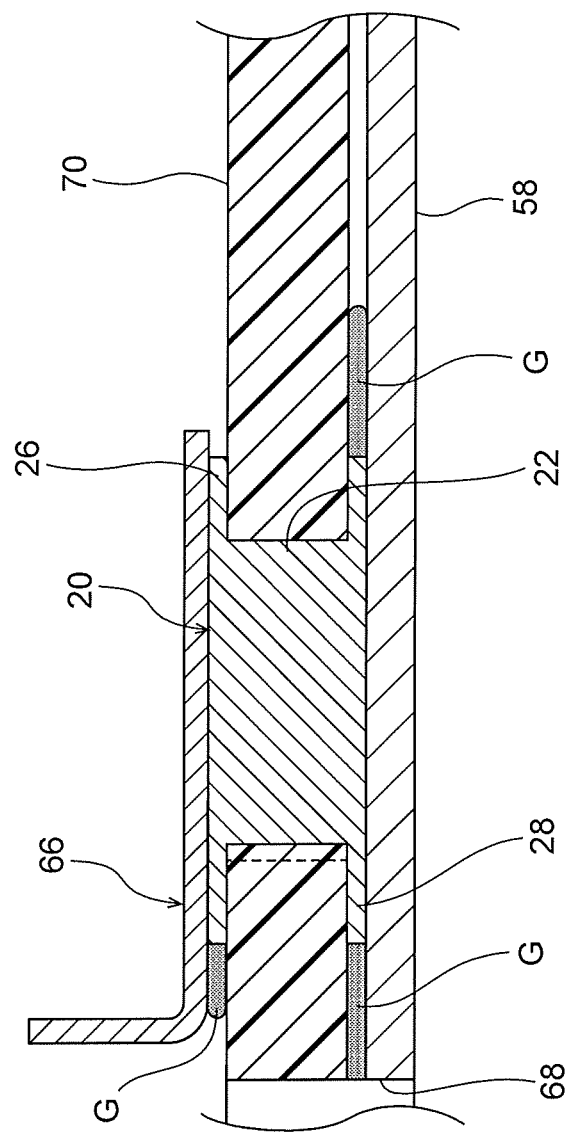
FIG. 11 is a cross-sectional view across a line B-B in FIG. 10.

Furthermore, as is shown, in FIG. 10 and FIG. 11, for example, it is also possible for the joining structure 10 according to the present exemplary embodiment to be used when mounting a retainer 66 that reinforces an aperture portion 68 that is used to mount a speaker (not shown in the drawings). In other words, tips 20 may be provided by insert molding in, for example, (five) suitable locations around the pentagonal aperture portion 68 that is formed in a panel 70 that is made of resin.

In this case, the retainer 66 can be joined via spot welding to the protruding portions 26 of the tips 20 that are protruding from the front surface of the panel 70, and can also be joined via the adhesive agent G to the front surface of the panel 70 around those protruding portions 26. Additionally, if weld bolts (or weld nuts) are attached to this retainer 66, then a speaker, which is a heavy object, can be assembled with a high degree of rigidity.

Note that, in the same way as is described above, it is also possible to join a flat plate-shaped steel plate 58 via spot welding to the protruding portions 28 that are protruding from the rear surface of the panel 70, and to join this steel plate 58 to the rear surface of the panel 70 around the protruding portions 28 via the adhesive agent G. In other words, the steel plate 58 may be attached as a backing plate to the panel 70. If this structure is employed, the strength and rigidity of the retainer 66 can be improved.

Second Embodiment

Next, a component joining structure 10 according to a second exemplary embodiment will be described. Note that portions that are the same as in the above-described first exemplary embodiment are given the same descriptive symbols, and a detailed description thereof (including actions that are the same) is omitted if appropriate.

Figure 12:
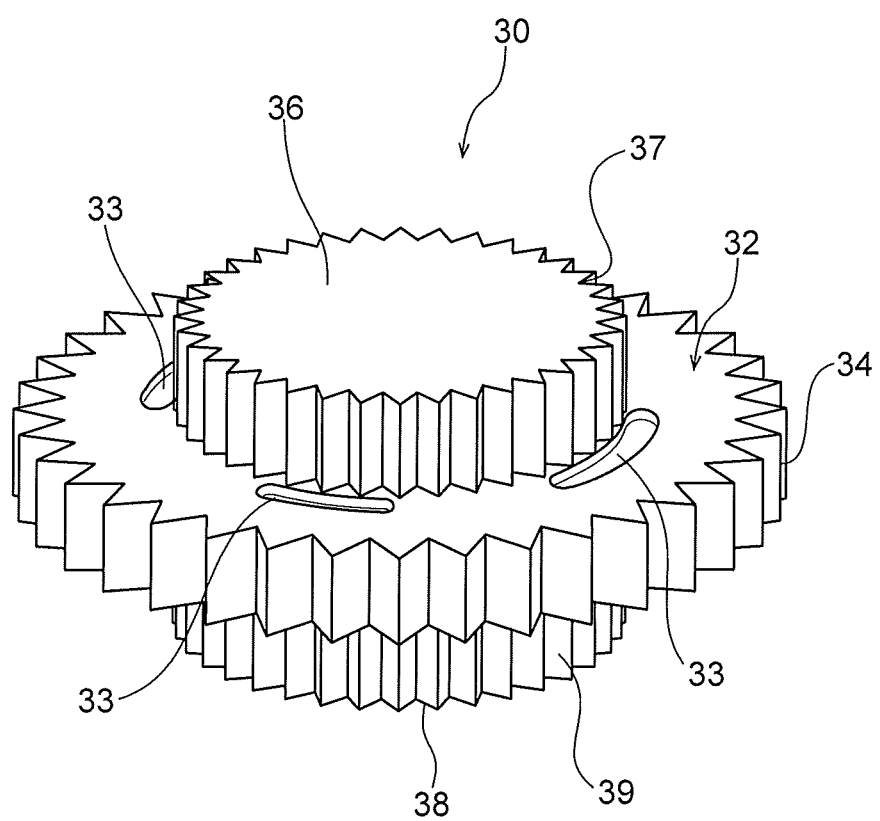
FIG. 12 is a perspective view of a tip forming part of a joining structure according to a second exemplary embodiment.
Figure 13:
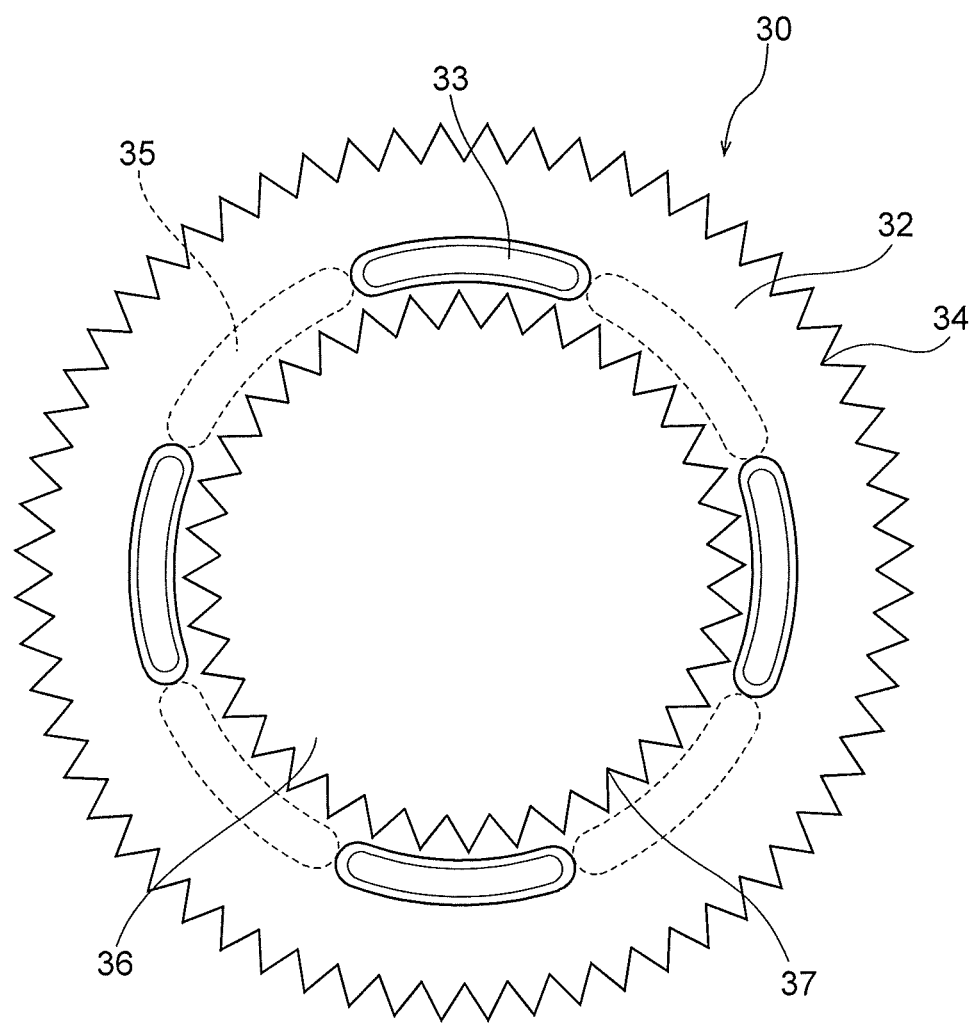
FIG. 13 is a plan view of a tip forming part of the joining structure according to the second exemplary embodiment.

As is shown in FIG. 12 through FIG. 14, the tips 30 of a joining structure 10 according to the second exemplary embodiment have a circular plate-shaped central plate portion 32 on whose outer circumferential surface are formed serrations 34 that serve as a detent portion, and circular plate-shaped protruding portions 36 and 38 whose outer diameters are smaller than an outer diameter of the central plate portion 32, and that are provided integrally (and coaxially) with centers respectively of one surface and another surface of the central plate portion 32 so as to protrude outwards therefrom.

The protruding portion 36 and the protruding portion 38 have mutually identical shapes, and serrations 37 and 39 are formed as detent portions respectively on outer circumferential surfaces of the protruding portion 36 and the protruding portion 38. Additionally, a plurality of groove portions 33 and 35 are formed at equally spaced intervals in a circumferential direction respectively on the one surface and on the other surface of the central plate portion 32 on the outer side of the protruding portions 36 and 38.

When viewed from the axial direction thereof, the groove portions 33 on the one surface side and the groove portions 35 on the other surface side are each formed in a circular arc shape extending around the outer circumferential surfaces of the protruding portion 36 and the protruding portion 38 respectively. Additionally, when viewed from the axial direction thereof, the groove portions 33 on the one surface side and the groove portions 35 on the other surface side are formed in positions that do not overlap with each other between the one surface side and the other surface side.

As a result, compared with a structure in which, when viewed from the axial direction thereof, at least a portion of the groove portions 33 on the one surface side and the groove portions 35 on the other surface side do mutually overlap with each other between the one surface side and the other surface side, there are no portions where the thickness of the central plate portion 32 is excessively thin. In other words, a structure is created in which any reduction in the rigidity of the central plate portion 32 on the outer side in the radial direction of the protruding portions 36 and 38 is inhibited.

The tips 30 having this type of structure are provided by insert molding, for example, in the flange portion 52A of the center pillar reinforcement 52, however, at this time, at least a portion of the protruding portion 36 and at least a portion of the protruding portion 38 protrude for a predetermined height (for example, approximately 0.5 mm) respectively from the one surface and from the other surface of the flange portion 52A.

In other words, when setting the tip 30 inside the metal mold (not shown in the drawings), the tip 30 is set in the metal mold such that at least a portion of the protruding portion 36 and at least a portion of the protruding portion 38 are held in the metal mold. Subsequently, as a result of fiber-reinforced resin penetrating the serrations 34 and the grooves 33 and 35 of the central plate portion 32, and penetrating the serrations 37 and 39 of the protruding portions 36 and 38, the tip 30 is molded integrally with the flange portion 52A while any rotation of the tip 30 is prevented, and with a firm join (i.e., a tight adhesion) being maintained.

Furthermore, when the flange portion 48A of the center pillar inner 48 and the flange portion 46A of the side panel outer 46 are being joined respectively to the one surface and to the other surface of the flange portion 52A of the center pillar reinforcement 52, the flange portion 48A and the flange portion 46A are mutually superimposed on the one surface and on the other surface respectively of the flange portion 52A. At this time, uniform gaps S where the adhesive agent G is to be provided are formed between the flange portion 52A and the flange portion 48A and between the flange portion 52A and the flange portion 46A as a result of the protruding portion 36 and the protruding portion 38 protruding to a predetermined height.

Accordingly, even if the tips 30 of the second exemplary embodiment are provided by insert molding in the flange portion 52A of the center pillar reinforcement 52, the same actions and effects are obtained as in the above-described first exemplary embodiment. In other words, it is possible to either inhibit or to completely prevent galvanic corrosion from occurring between the flange portion 52A and the flange portion 48A and between the flange portion 52A and the flange portion 46A, so that quality assurance arising from a stable adhesion strength can be achieved.

The joining structures 10 according to the present exemplary embodiments have been described above based on the drawings, however, the joining structures 10 according to the present exemplary embodiments are not limited to those illustrated, and various suitable design modifications and the like may be made insofar as they do not depart from the spirit or scope of the present disclosure. For example, the detent portion is not limited to the serrations 24, 34, 37, and 39 illustrated above.

Moreover, the protruding portions 26 and 28 of the tips 20 and the protruding portions 36 and 38 of the tips 30 are not limited to those formed in a circular plate shape, and they may also be formed, for example, in an elliptical plate shape or a rectangular plate shape (i.e., in an oblong shape) that is elongated in the longitudinal direction of the component (i.e., the flange portion 52A in the above-described exemplary embodiments) with which they are being integrally insert molded.

If the protruding portions 26 and 28 of the tips 20 and the protruding portions 36 and 38 of the tips 30 are formed in an elliptical plate shape or a rectangular plate shape (i.e., in an oblong shape) that is elongated in the longitudinal direction of the component with which they are being integrally insert molded, then depending on the shape and the like of the metal component, the advantage is gained that any positional irregularities when that metal component is being joined to the tips 20 or the tips 30 can be easily dealt with.

In other words, by appropriately devising the shape of the tips 20 (i.e., the shapes of the shaft central portion 22 and the protruding portions 26 and 28) and the shape of the tips 30 (i.e., the shapes of the central plate portion 32 and the protruding portions 36 and 38), then not only is it possible to ensure a superior join strength (i.e., adhesion strength) when the tips 20 or the tips 30 are being insert molded in a resin component, but a superior join strength when they are being spot welded to a metal component can also be ensured.

What is claimed is:

1. A component joining structure comprising:
   a resin component;
   a metal tip that is provided in the resin component by insert molding such that the meta tip is formed integrally with the resin component and the metal tip is unable to rotate relative to the resin component, the metal tip being a monolithic unitarily-formed structure including a cylindrical shaft-shaped central portion and parallel opposing circular-shaped protruding portions provided at end portions of the central portion in an axial direction of the shaft-shaped central portion, the protruding portions radially-protruding outwards beyond the central portion, a diameter of each of the protruding portions being equal to each other and defining a fixed gap between the protruding portions, and a detent portion being formed around an outer circumferential surface of the central portion;

wherein the resin component is insert-molded in the fixed gap between the protruding portions around the central portion in non-rotatable engagement with the detent portion, and the protruding portions engage opposing outer faces of the resin component; and a pair of metal components, each metal component being spot-welded to a respective one of the protruding portions on an outer axial face thereof, and each metal component being disposed parallel to the resin component and joined to the resin component by an adhesive agent that is provided in a gap formed, by the protruding portions, between a respective one of the outer faces of the resin component and an opposing face of the metal component.

2. The component joining structure according to claim 1, wherein the detent portion comprises serrations.

* * * * *